United States Patent
Nouet

(10) Patent No.: US 6,612,727 B2
(45) Date of Patent: Sep. 2, 2003

(54) LIGHTING APPARATUS IN A MOTOR VEHICLE

(75) Inventor: Régis Nouet, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/097,212

(22) Filed: Mar. 12, 2002

(65) Prior Publication Data

US 2002/0145880 A1 Oct. 10, 2002

(30) Foreign Application Priority Data

Mar. 14, 2001 (FR) ............................................ 01 03497

(51) Int. Cl.⁷ .................................................. F21V 1/00
(52) U.S. Cl. ........................ 362/508; 362/211; 362/297; 362/541; 313/115
(58) Field of Search .................................. 362/508, 211, 362/215, 499, 541, 297; 313/112, 115, 272

(56) References Cited

U.S. PATENT DOCUMENTS

| 2,120,870 A | 6/1938 | Roper | 176/26 |
| 2,146,593 A | 2/1939 | Roper | 240/41.25 |
| 4,480,296 A | * 10/1984 | Gagnon et al. | 362/519 |
| 4,580,199 A | * 4/1986 | Wurster et al. | 362/211 |
| 4,772,988 A | * 9/1988 | Brun | 362/518 |
| 6,068,391 A | * 5/2000 | Saladin et al. | 362/516 |

FOREIGN PATENT DOCUMENTS

| EP | 0 989 354 | 3/2000 |
| EP | 1 003 205 | 5/2000 |
| FR | 745839 | 5/1933 |
| WO | 98 49716 | 11/1998 |

* cited by examiner

*Primary Examiner*—Sandra O'Shea
*Assistant Examiner*—Ali Alavi
(74) *Attorney, Agent, or Firm*—Morgan & Finnegan, LLP

(57) ABSTRACT

A motor vehicle has left and right hand headlights, each with a reflector having a complex surface with a lamp fitted within the reflector. Each lamp has a dipped or passing beam filament and a main beam filament. The position of the main beam filament is defined by its angular position with respect to a position of origin vertically below the main axis of the lamp, on a circle centered on the main axis, the main beam filament being oriented positively in the trigonometric direction looking forward along the main axis. The angular position of each main beam filament is in the range between −90° and +90°, and is different for each headlight.

7 Claims, 5 Drawing Sheets

LIGHTING APPARATUS IN A MOTOR VEHICLE

FIELD OF THE INVENTION

The present invention concerns an arrangement of lighting apparatus in a vehicle.

More particularly, the present invention relates to an arrangement of lighting apparatus in a motor vehicle comprising a left hand headlight and a right hand headlight arranged in the front of the vehicle, the apparatus being of the type in which each headlight comprises a reflector of the type having a complex surface of concave, generally parabolic form, the geometry of which is optimised for the short range, or dipped beam, or passing beam function.

A lamp, arranged inside the reflector, comprises a filament for the dipped beam function and a filament for the main beam function. The dipped beam filament is arranged generally on the main axis of the lamp which is oriented towards the front. This axis is substantially horizontal and parallel to the longitudinal direction of the vehicle, while the main beam filament is arranged generally on a secondary axis parallel to the main axis and offset radially from the latter. The position of the main beam filament is defined by its angular position with respect to a position of origin situated in a vertical plane containing the main axis, below the dipped beam filament, and along a circle centred on the main axis and oriented positively in the trigonometric direction as seen looking forward along the main axis.

BACKGROUND OF THE INVENTION

A new normalised type of double filament lamp, without a masking cup, of the "H13" type, has been developed for equipping vehicle headlights in order to satisfy legal requirements on vehicle lighting, especially in the United States and Europe. This type of lamp has two substantially parallel filaments, one for the dipped beam function and the other for the main beam function.

This type of lamp is arranged in a vehicle projector which is optimised to give the dipped beam function and which includes a complex surface reflector.

The complex surface reflector is a reflector in which the reflective surface consists of a large number of portions of parabolas which are so oriented that the headlight produces a regulation dipped beam. Such a dipped beam is characterised in particular by a "cut-off", that is to say a directional limit above which the only light intensity emitted has little or no ability to dazzle. The cut-off consists generally of a horizontal half plane, which lies to the left of the longitudinal axis of the headlight for driving on the right hand side of the road, and a half plane which is slightly inclined upwards, to the right of the said longitudinal axis. This last mentioned half plane is raised by a so-called cut-off elevation angle which is 15° for a normalised European beam.

The lighting produced by such a beam on a screen placed about 25 meters in front of the headlight is shown in FIG. 1 of the accompanying drawings (which is described in the section "Brief Description of the Drawings" later in this specification). Referring to FIG. 1, the point HV is the projection of the optical axis of the headlight at the intersection of the vertical plane v'v with the horizontal plane h'h. The cut-off is defined by the straight line Ox which lies parallel to, and below, the horizontal axis h'h, which extends from the point O towards the left, and by the line Oy, inclined at 15° and extending from the point O upwards and to the right.

The main beam is generally centred on the point HV, where its light intensity is required to be at a maximum.

It will be noted that this description is made with reference to a vehicle designed for driving on the right. For a vehicle driving on the left, it is sufficient to consider the drawings as showing the screen or the headlight reversed about the axis v'v.

When the headlight is operating in dipped beam mode, it is found that the light emitted by the dipped beam filament is reflected on the main beam filament which is situated close to the dipped beam filament. This causes parasitic light rays to be emitted outside the dipped beam, and in particular above the cut-off. These parasitic light rays can dazzle the drivers of vehicles travelling in the opposite direction, in the left hand lane.

In addition, the main beam filament is arranged in the emitting zone of the dipped beam filament so that it gives rise to shadow zones or reduces the light intensity in some illuminating zones of the dipped beam.

When the headlight is working in main beam mode it is necessary that the light intensity of the illuminating beam produced by the main beam filament is at a maximum at the point HV.

In current practice, the lamp holder is arranged in an identical way in both the left hand and right hand headlights, so that the main beam filament is arranged at about +50° with respect to the position of origin on the circle defined above. This angular position enables a dipped beam and a main beam to be obtained which conform with the regulations.

However, this angular position does represent a compromise which does not lead to optimum headlight efficiency. In particular, in main beam mode, the headlight does not make sufficient use of the maximum lighting capacities of the main beam filament. The main beam is offset sideways.

DISCUSSION OF THE INVENTION

An object of the invention is to overcome the above mentioned drawbacks, and to propose a vehicle headlight that gives a more efficient main beam, while conforming with the regulations.

According to the invention, lighting apparatus of the type defined under the heading "Field of the Invention" above is characterised in that the angular position of each main beam filament lies in the range between −90° and +90°, and in that the angular position of the main beam filament of the left hand headlight is different from the angular position of the filament in the right hand headlight.

The angular positions of the two main beam filaments are preferably of opposite signs. In this connection, the angular position of the main beam filaments of the left and right hand headlights may be of negative and positive signs respectively, or of positive and negative signs respectively.

The absolute value of the angular position of positive sign is equal to about 60°, and the absolute value of the angular position of negative sign is equal to about 40°.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
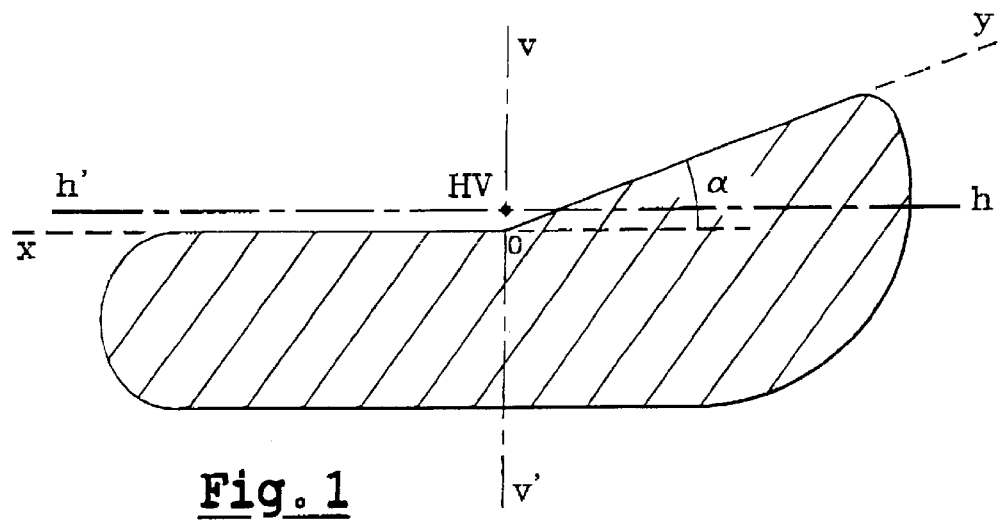
FIG. 1, already discussed above, is a diagram showing a regulation dipped or passing beam.
Figure 2:
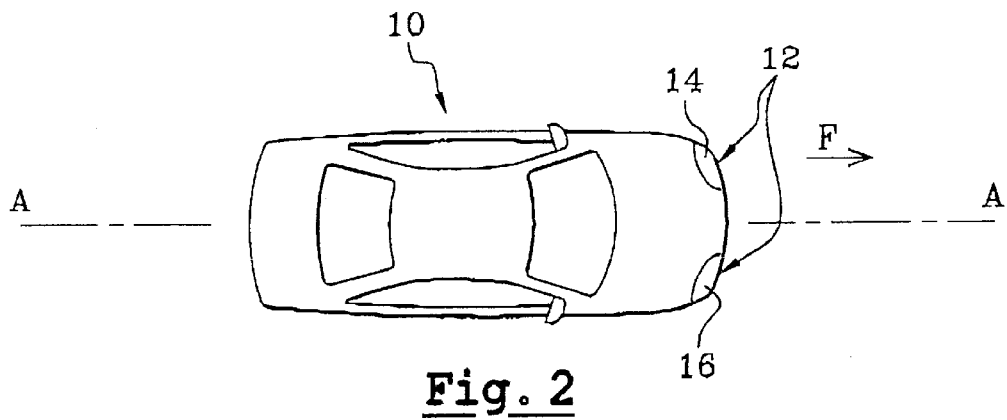
FIG. 2 is a top plan view showing diagrammatically a vehicle which includes lighting apparatus made in accordance with the features of the invention.

Reference is here made to FIG. 2, which shows a vehicle 10 having equipment which comprises lighting apparatus 12 in accordance with the invention. The apparatus 12 consists of a left hand headlight 14 and a right hand headlight 16, fitted to the front of the vehicle 10 on each side of its horizontal longitudinal axis A—A and oriented forwards in the direction of the arrow F in FIG. 2.

Figure 3:
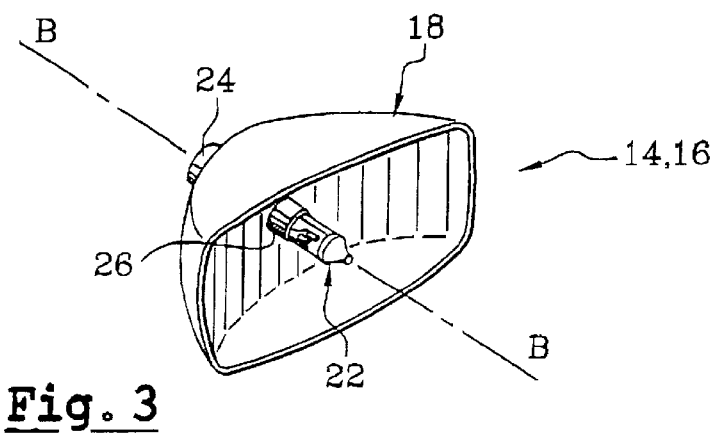
FIG. 3 is a perspective view showing diagrammatically one headlight of the vehicle in FIG. 2.

Reference is now made to FIG. 3, in which each headlight 14 or 16 comprises a reflector 18, which is of the type having a complex surface of concave generally parabolic form, the geometry of which is optimised in order to give a dipped or passing beam function, being in particular in accordance with the arrangements disclosed in French published patent specifications Nos. FR 2 760 067A and FR 2 760 068A.

Figure 4:
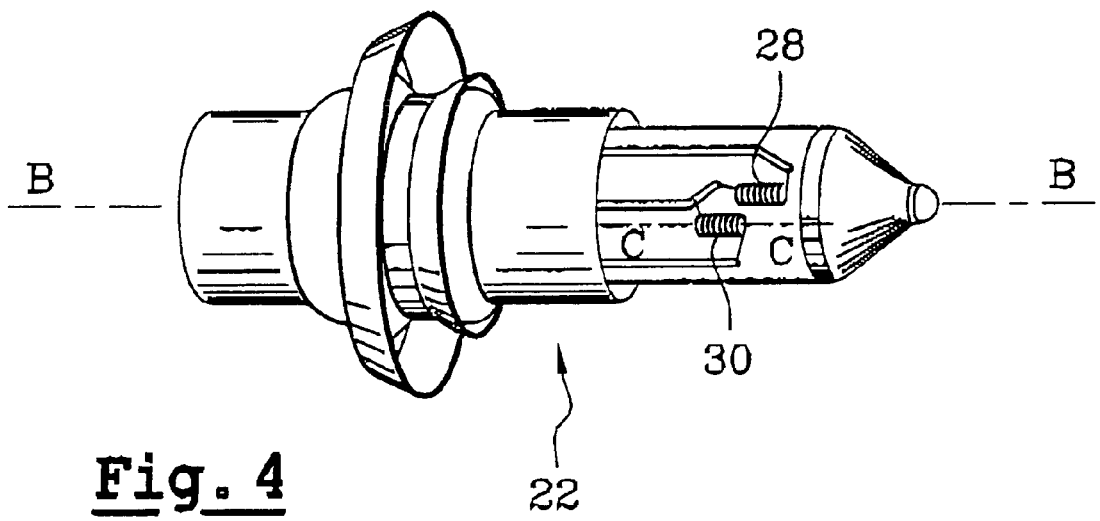
FIG. 4 is a perspective view showing diagrammatically a lamp of the H13 type.

The base 20 of the reflector 18 has a through hole to accommodate a lamp 22 of the H13 type which is mounted on a support 24 inside the reflector 18, the lamp extending through the hole 26 thereby defined. The lamp 22, which is shown in detail in FIG. 4 (to which reference is now made), is of generally cylindrical form on a main axis B—B, which is substantially horizontal and parallel to the longitudinal direction A—A of the vehicle 10. The main axis B—B is oriented forwards.

The lamp 22 has a filament 28 for the dipped beam function, and a filament 30 for the main beam function. The dipped beam filament 28 is oriented generally along the main axis B—B of the lamp, and is situated generally at the focus of the reflector 18. By contrast, the main beam filament 30 is oriented generally along a secondary axis C—C parallel to the main axis B—B, and is offset radially with respect to the latter. The main beam filament 30 is, in this example, offset axially towards the rear with respect to the dipped beam filament 28.

Figure 5:
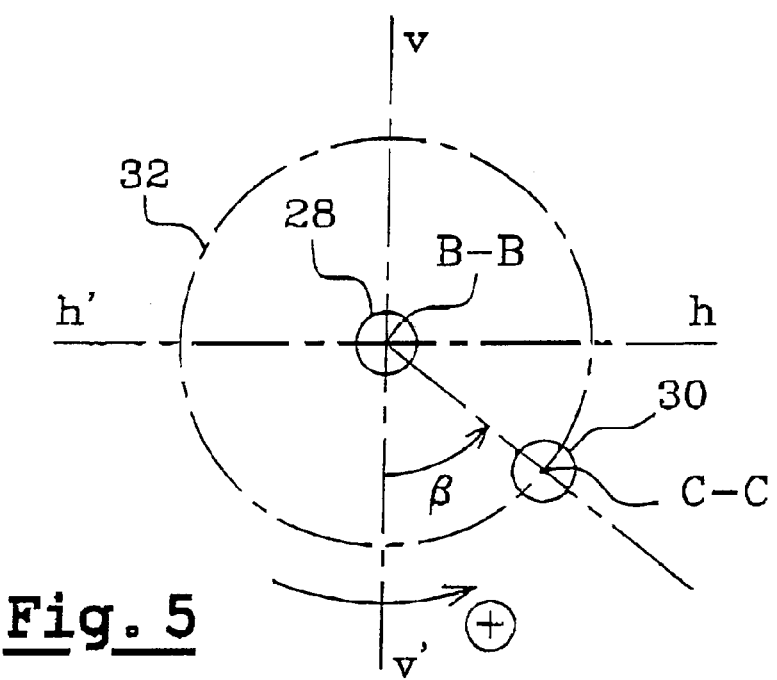
FIG. 5 is a diagram showing the position of the main beam filament with respect to the dipped beam filament, seen from the rear in the direction of the arrow F5 in FIG. 4.

With reference now to FIG. 5, the position of the main beam filament 30 is defined by its angular position $\beta$, with respect to a position of origin ($\beta=0$) which is a vertical plane containing the main axis B—B. The main beam filament is below the dipped beam filament 28, on a circle 32 centred on the main axis B—B and oriented positively in the trigonometric direction as seen looking forward along the main axis B—B.

If the lamp 22 and its support 22 are caused to pivot about the main axis B—B, the position of the dipped beam filament 28 does not vary with respect to the reflector 18, while the angular position or orientation $\beta$ of the main beam filament 30 does vary. Therefore its position with respect to the reflector 18 also varies.

In order to determine the optimum angular position $\beta$ of the main beam filament 30, the position of its image, reflected towards infinity, is calculated for each point on the reflective surface of the reflector 18, for a given angular position $\beta$.

Figure 6:
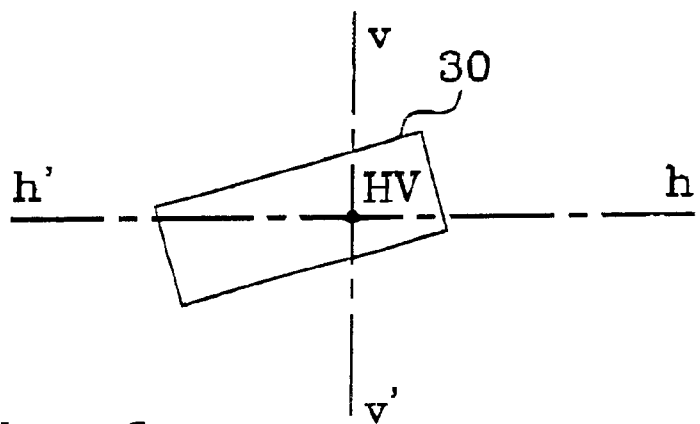
FIG. 6 is a diagram showing one example of the image of the main beam filament projected on the point HV in the main beam headlight by a given point on the reflector of the headlight in FIG. 3.

Reference is now made to FIG. 6. This shows one example of an image of the main beam filament 30 for one point on the reflector 18. In this example it is assumed that the image of the main beam filament 30 is projected on the point HV. For each image projected on the point HV, an arbitrary value of 1 will be taken, while for the other images, an arbitrary value 0 will be taken.

Figure 7:
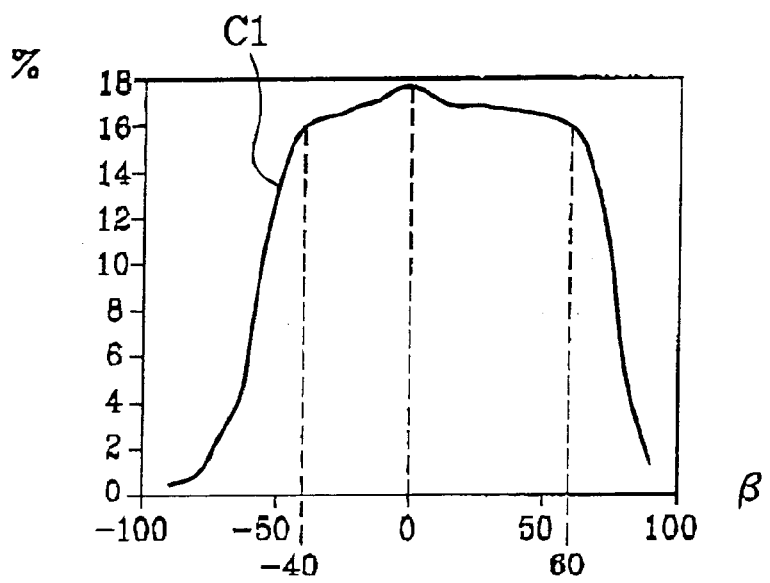
FIG. 7 is a diagram showing the percentage of images of the main beam filament that are projected on the point HV as a function of the angular position of the main beam filament.

The more images that are projected on the point HV, the more effective will be the main beam. Accordingly, theoretical calculations and/or measurements are carried out in order to determine, for each angular position $\beta$, the number of images projected on the point HV. From this, the curve C1 in FIG. 7 is deduced. FIG. 7 shows the percentage of points on the reflector 18 which project the image of the main beam filament 30 on the point HV, as a function of the angular position $\beta$ of the main beam filament 30.

It is found that the efficiency of the main beam filament 30 is at a maximum when it occupies its angular position $\beta$ of origin, that is to say it is situated in the vertical plane of the dipped beam filament 28, underneath the latter.

It is also found that the curve C1 defines a portion, extending roughly between the angular positions −40° and +60°, for which the efficiency of the main beam filament 30 stays very close to its maximum value. This top portion of the curve is not symmetrical with relation to the angular position $\beta$ of origin, because the reflector 18 is not symmetrical with respect to the vertical and longitudinal plane v'v (see FIG. 6). The geometry of the reflector is optimised in order to give the dipped or passing beam function which produces an asymmetrical lighting beam.

Similar calculations and/or measurements are performed in order to determine the angular positions $\beta$ of the main beam filament 30 that produces the smallest possible number of parasitic light rays, which would give rise to dazzling in vehicles travelling in the opposite direction.

When the short range (or passing, or dipped beam) filament 28 is lit, some of the light rays emitted are reflected on the main beam filament 30, which causes it to give off light over about a quarter of the surface of each of its images.

Figure 8:
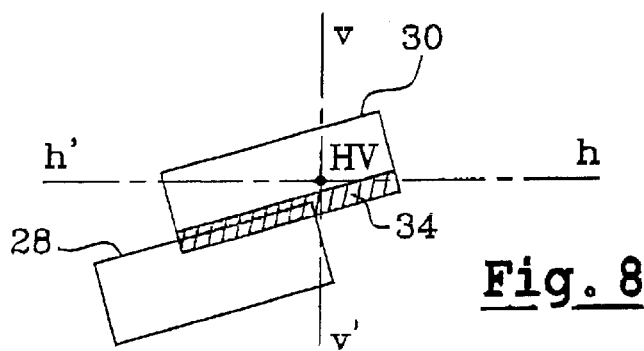
FIG. 8 is a diagram similar to that in FIG. 6, and shows one example of images of the dipped beam and main beam filaments projected on the point HV in a dipped beam headlight from a given point on the reflector in the headlight of FIG. 3.

In this connection reference is made to FIG. 8, which shows one example of images of the passing beam filament 28 and main beam filament 30, for a given point on the reflector 18, when the passing beam filament 28 is lit. The dazzle zone 34 in the image of the main beam filament 30 is shown hatched in FIG. 8.

In order to give a regulation dipped beam function, the dazzle zone 34 must be situated outside the point HV, since legislation defines a maximum light intensity which is not to extend beyond the point HV, in the dipped beam function. Optimisation of the main beam function therefore consists of keeping the remaining three-quarters of each of the images of the main beam filament 30 at a maximum on the point HV.

The value 1 is arbitrarily given to each image of the main beam filament 30 in which the dazzle zone 34 of that image is projected on the point HV. For the other images, the arbitrary value 0 is given. For example, the image shown in FIG. 8 has the value 0 because the dazzle zone 34 lies under the point HV. The larger the number of images having their dazzle zone 34 projected on the point HV, the more will the main beam include dazzling parasitic light rays. Theoretical calculations and/or measurements are therefore carried out to determine, for each angular position β, the number of images in which the dazzle zone 34 is projected on the point HV.

Figure 9:
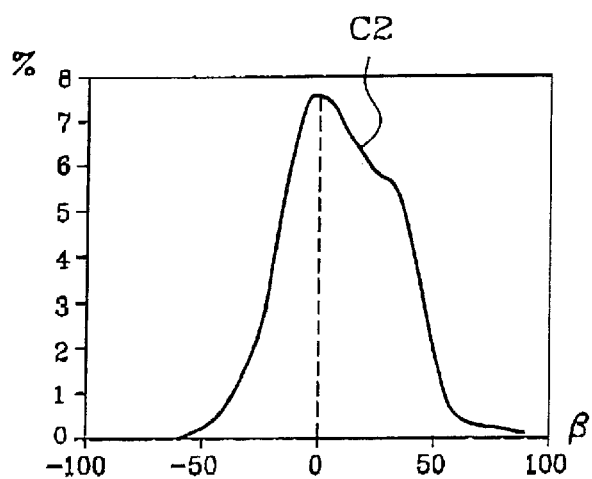
FIG. 9 is a diagram similar to that in FIG. 7, and shows the percentage of images of the main beam filament, the dazzling zone of which is projected on the point HV, as a function of the angular position of the main beam filament.

This produces the curve C2 in FIG. 9, to which reference is now made. FIG. 9 represents the percentage of points on the reflector 18 which project the dazzle zone 34 of the image of the main beam filament 30 on the point HV, as a function of the angular position β of the main beam filament 30. It is found that dazzling in the passing beam mode is at a maximum when the main beam filament 30 occupies its angular position β of origin. The closer the angular position β of the main beam filament 30 is to −90° or +90°, the more dazzling will occur.

Figure 10:
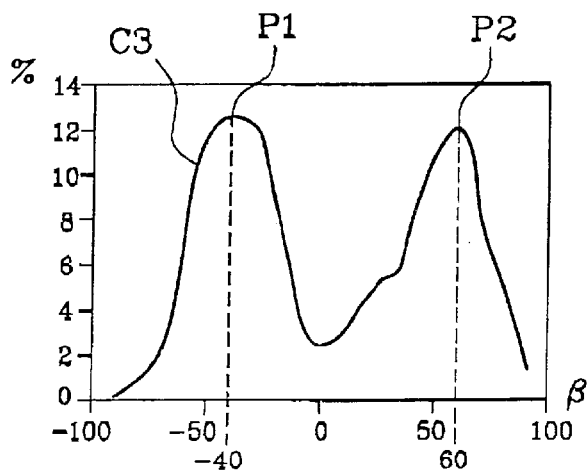
FIG. 10 is a diagram similar to that in FIG. 7, and shows the quality of illumination given by the headlight, in a main beam headlight and a dipped beam headlight, as a function of the angular position of the main beam filament.

By effecting the difference between the curve C1 in FIG. 7 and the curve C2 in FIG. 9 (i.e. by, in effect, subtracting C2 from C1), a curve C3 is obtained. This curve C3 is shown in FIG. 10 and represents illumination quality. It contains two peaks P1 and P2 which represent two respective groups of values of angular position β of the main beam filament 30 at which the efficiency of the main beam headlight is close to the maximum value, while the amount of dazzle in the dipped beam mode is close to the minimum value. These two peaks P1 and P2 are generally centred on the values −40° and +60°.

It can be seen from the curve C3 that there are two optimum angular positions β for the main beam filament 30 that enable maximum efficiency to be obtained in the main beam mode, without giving rise to dazzle in the dipped beam mode.

Figure 11:
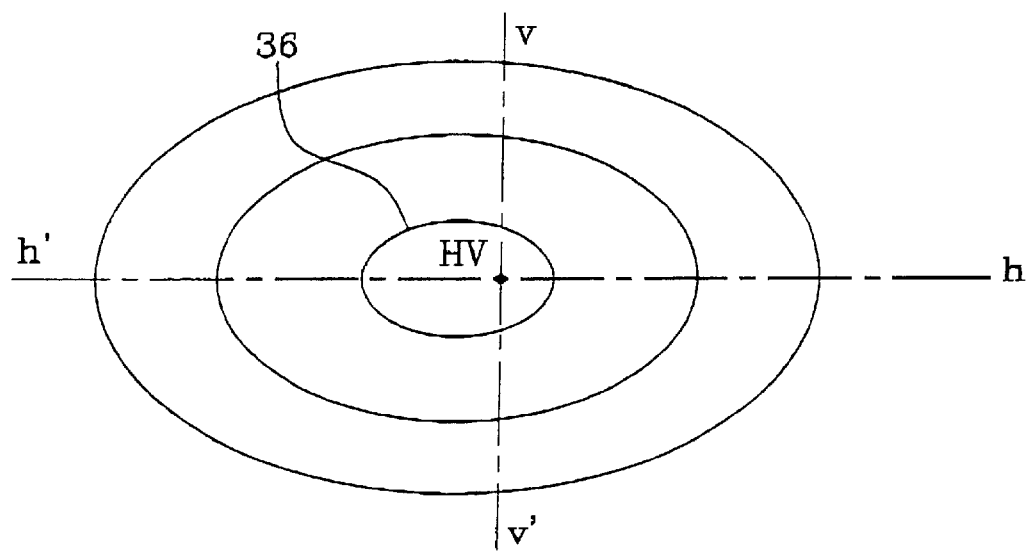
FIG. 11 is a diagram showing the main beam for an angular position of the main beam filament which is equal to +60°.

Reference is now made to FIG. 11 which shows, projected on a screen, the lighting beam produced in the main beam mode by a headlight 14, 16 having a main beam filament 30 disposed at +60°. The lines in FIG. 11 are isolux curves, that is to say they pass through the points on the screen which receive the same value of light intensity. The line 36 in this example delimits a patch of maximum light intensity produced by the headlight 14, 16 in main beam mode. It follows that the patch 36 of maximum light intensity is not centred on the point HV, but is slightly offset to the left.

Figure 12:
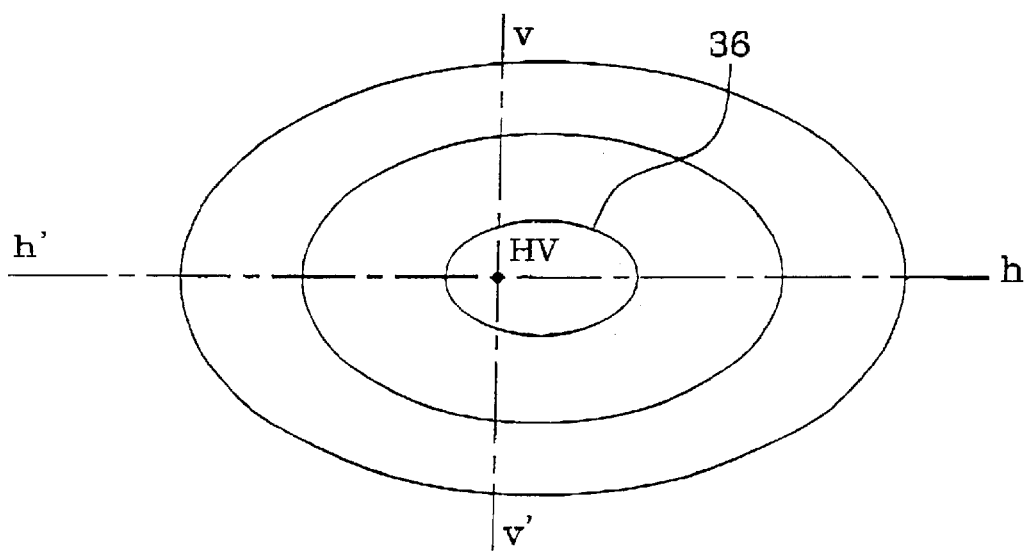
FIG. 12 is a diagram showing the main beam for an angular position of the main beam filament equal to −40°.

With reference to FIG. 12, by contrast, for a headlight 14, 16 having a main beam filament 30 disposed at −40°, it is seen that the patch 36 of maximum light intensity in the main beam mode is slightly offset to the right.

It is preferably chosen that the main beam filament 30 of the left hand headlight 14 be disposed in an angular position β which is substantially equal to +60°, with the main beam filament 30 of the right hand headlight 16 being in an angular position β which is substantially equal to −40°. This arrangement enables the complementary effect of the lighting beams produced by each of the headlights 14 and 16 to be made use of in order to obtain a patch of light having maximum light intensity in the main beam mode, this patch being substantially centred on the point HV.

This complementary arrangement also enables deficiencies in illumination, in certain zones of the main beam and in certain zones of the dipped beam, to be compensated for. Such deficiencies are due to the masking effect produced by the presence of an extinguished filament in the lighting zone of the lit filament.

What is claimed is:

1. A lighting apparatus for a motor vehicle defining a longitudinal direction of the vehicle, said apparatus comprising a left hand headlight and a right hand headlight, said headlights being at the front of the vehicle, wherein each headlight has:

a reflector defining a complex, concave, generally parabolic reflective surface having geometry optimized for giving the headlight a dipped beam function, and a lamp disposed within the reflector, the lamp defining a substantially horizontal main axis of the lamp and a secondary axis of the lamp parallel to said main axis, said main and secondary axes being oriented forwardly and parallel to said longitudinal direction of the vehicle, the secondary axis being offset radially from the main axis, the lamp having a first filament oriented generally along the main axis of the lamp for giving a dipped beam, and a second filament, oriented generally along the secondary axis of the lamp for giving a main beam, the lamp further defining a vertical plane containing the main axis of the lamp and a position of origin in said vertical plane, the second filament of the lamp being in a position below the first filament, on a circle centered on said position of origin and defining an angle with said vertical plane, the second filament being oriented positively in the trigonometrical direction looking forwards along said main axis, and wherein, for said second filament, said angle is in the range −90° to +90°, said angle having different values for said second filaments of the left hand and right hand headlights respectively.

2. The apparatus according to claim 1, wherein the two said second filaments define said angles of opposite signs.

3. The apparatus according to claim 2, wherein said signs are negative and positive for the left hand and right hand headlights respectively.

4. The apparatus according to claim 2, wherein said signs are positive and negative for the left hand and right hand headlights respectively.

5. The apparatus according to claim 2, wherein said angle of positive sign has an absolute value of about 60°, and said angle of negative sign has an absolute value of about 40°.

6. The Apparatus of claim 1, wherein the first filament is substantially coaxial with the main axis, and the second filament is substantially coaxial with the secondary axis.

7. The apparatus of claim 1, wherein the second filament is offset axially with respect to the first filament.

* * * * *